(12) United States Patent
Russell et al.

(10) Patent No.: US 11,731,478 B2
(45) Date of Patent: *Aug. 22, 2023

(54) VEHICLE DAMPING CONTROL

(71) Applicant: Ford Global Technologies, LLC., Dearborn, MI (US)

(72) Inventors: David Michael Russell, Ann Arbor, MI (US); Charles Gavin McGee, Brighton, MI (US); Ben Bulat, Plymouth, MI (US); Russ Lee Norton, Brownstown Township, MI (US); John Keller, Farmington Hills, MI (US); Darrell Erick Butler, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

This patent is subject to a terminal disclaimer.

(21) Appl. No.: 17/166,901

(22) Filed: Feb. 3, 2021

(65) Prior Publication Data

US 2021/0155067 A1    May 27, 2021

Related U.S. Application Data

(63) Continuation of application No. 16/374,296, filed on Apr. 3, 2019, now Pat. No. 10,974,564, which is a (Continued)

(51) Int. Cl.
*B60G 17/06* (2006.01)
*B60G 17/018* (2006.01)
*B60G 17/019* (2006.01)

(52) U.S. Cl.
CPC ..... *B60G 17/018* (2013.01); *B60G 17/01908* (2013.01); *B60G 17/01933* (2013.01); (Continued)

(58) Field of Classification Search
CPC ............ B60G 17/018; B60G 17/01933; B60G 17/06; B60G 17/01908; B60G 2600/182; B60G 2400/204; B60G 2500/10; B60G 2202/25; B60G 2800/22; B60G 2800/91; B60W 10/22; B60W 2710/226; B60W 2510/22
(Continued)

(56) References Cited

U.S. PATENT DOCUMENTS 4,733,883 A     3/1988  Sugasawa
5,367,459 A  *  11/1994  Shtarkman ........... B60G 17/018
                                                           280/93.5
(Continued)

*Primary Examiner* — Dalena Tran
(74) *Attorney, Agent, or Firm* — David R. Stevens; Stevens Law Group (57) ABSTRACT

A system for damping control for a vehicle includes a parameter component and a damping adjustment component. The parameter component is configured to determine one or more driving parameters of a vehicle. The one or more driving parameters include a velocity of the vehicle. The damping adjustment component is configured to adjust damping of suspension of the vehicle during driving based on the one or more driving parameters. The damping adjustment component is also configured to adjust damping of suspension at a zero velocity for a threshold time period in response to transitioning from a non-zero velocity to the zero velocity.

20 Claims, 5 Drawing Sheets

Determine One Or More Driving Parameters Of A Vehicle
602

Adjust Damping Of Suspension Of The Vehicle During Driving Based On The One Or More Driving Parameters
604

Adjust Damping Of Suspension At A Zero Velocity For A Threshold Time Period In Response To Transitioning From A Non-zero Velocity To The Zero Velocity
606

Related U.S. Application Data continuation of application No. 15/345,231, filed on Nov. 7, 2016, now Pat. No. 10,286,745.

(52) U.S. Cl.
CPC .......... *B60G 17/06* (2013.01); *B60G 2400/10* (2013.01); *B60G 2400/20* (2013.01); *B60G 2600/182* (2013.01)

(58) Field of Classification Search
USPC ...... 701/37, 38, 70; 280/5.5, 5.515; 180/282
See application file for complete search history.

(56) References Cited

U.S. PATENT DOCUMENTS

| | | | | |
|---|---|---|---|---|
| 6,148,252 | A * | 11/2000 | Iwasaki | B60G 17/0152 701/37 |
| 6,859,713 | B2 * | 2/2005 | Pallot | B62D 6/003 701/72 |
| 8,229,642 | B2 * | 7/2012 | Post, II | B60W 40/064 701/48 |
| 8,322,728 | B2 * | 12/2012 | Hirao | B60G 17/015 280/5.506 |
| 9,067,601 | B2 * | 6/2015 | Itabashi | B60W 10/184 |
| 2009/0085309 | A1 | 4/2009 | Hirao | |

* cited by examiner

VEHICLE DAMPING CONTROL

CROSS REFERENCE TO RELATED PATENT APPLICATION(S)

The present disclosure is part of a continuation of U.S. patent application Ser. No. 16/374,296, filed on Apr. 3, 2019, which in turn is part of a continuation of U.S. patent application Ser. No. 15/345,231, filed on Nov. 7, 2016, the content of which is incorporated by reference in its entirety.

TECHNICAL FIELD

The present disclosure relates to vehicle damping control and more particularly relates to improving vehicle damping after a vehicle has come to a stop.

BACKGROUND

Automobiles provide a significant portion of transportation for commercial, government, and private entities. Autonomous vehicles and driving assistance systems are currently being developed and deployed to provide safety features, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive, navigate, and/or park a vehicle with little or no user input. Because vehicles often carry people or other cargo, it is of importance to provide a smooth ride for passenger comfort and cargo safety.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Semi-active damping systems provide suspension damping as a function of many factors, including but not limited to road inputs, driver inputs, etc. One example input into semi-active damping systems is the vehicle's forward velocity. Some systems change the damping level continuously as the vehicle drives down the road in order to optimize the vehicle's performance. The damping levels are changed by adjusting current sent to the dampers, which may be positioned at each wheel. In order to minimize the power used by the semi-active system, semi-active damping systems will stop sending current to the dampers when the vehicle is not in motion (e.g., vehicle velocity equals zero).

Applicants have recognized that, depending on the events immediately prior to vehicle velocity achieving zero, there is opportunity for transient body and/or wheel motions to continue for a time. For example, if a highly transient brake stop is performed and the vehicle comes to zero velocity while it is pitched forward, the accumulated energy in the vehicle's suspension springs will result in pitch oscillations that can be uncomfortable to the driver/occupants. In some cases, semi-active damping systems will be sending zero current to the dampers and the pitch oscillations may not be damped optimally.

Applicants have developed systems, methods, and devices for controlling damping of a vehicle. According to one embodiment, a system for damping control for a vehicle includes a parameter component and a damping adjustment component. The parameter component is configured to determine one or more driving parameters of a vehicle. The one or more driving parameters include a velocity of the vehicle. The damping adjustment component is configured to adjust damping of suspension of the vehicle during driving based on the one or more driving parameters. The damping adjustment component is also configured to adjust damping of suspension at a zero velocity for a threshold time period in response to transitioning from a non-zero velocity to the zero velocity. For example, the damping adjustment component may continue, for a time, to monitor and/or adjust damping of for the vehicle even after it has reached zero velocity.

Usage of the damper controller teachings and algorithms disclosed herein may be used to extend all or some of a semi-active damping systems' control functions for a time after vehicle velocity achieves zero. Providing semi-active damping after a stop can deliver improved damping control over residual body and/or wheel motions to provide improved smoothness and comfort even after a stop. For example, if zero amperage is provided to a damper, the damper coefficient may be low. If a vehicle has not yet "settled" after a stop, the low damper coefficient can result in pitch and/or roll oscillations after the stop is completed, depending on the transient behavior of the vehicle prior/during the stop. By extending damping control for a time after the stop, these residual body and/or wheel motions can be smoothed out improving overall comfort and vehicle performance.

The amount of time during which damping adjustment is active can be tunable to balance power usage with the functional benefits gained. In one embodiment, damping adjustment control may occur at every stop or may be used in response to situational recognition to determine when damping adjustment may be needed. For example, post stop damping control may only be used under conditions such as when there were braking pressures above some value, acceleration/deceleration outside a threshold, or pitch rate above some threshold.

Further embodiments and examples will be discussed in relation to the figures below.

Figure 1:
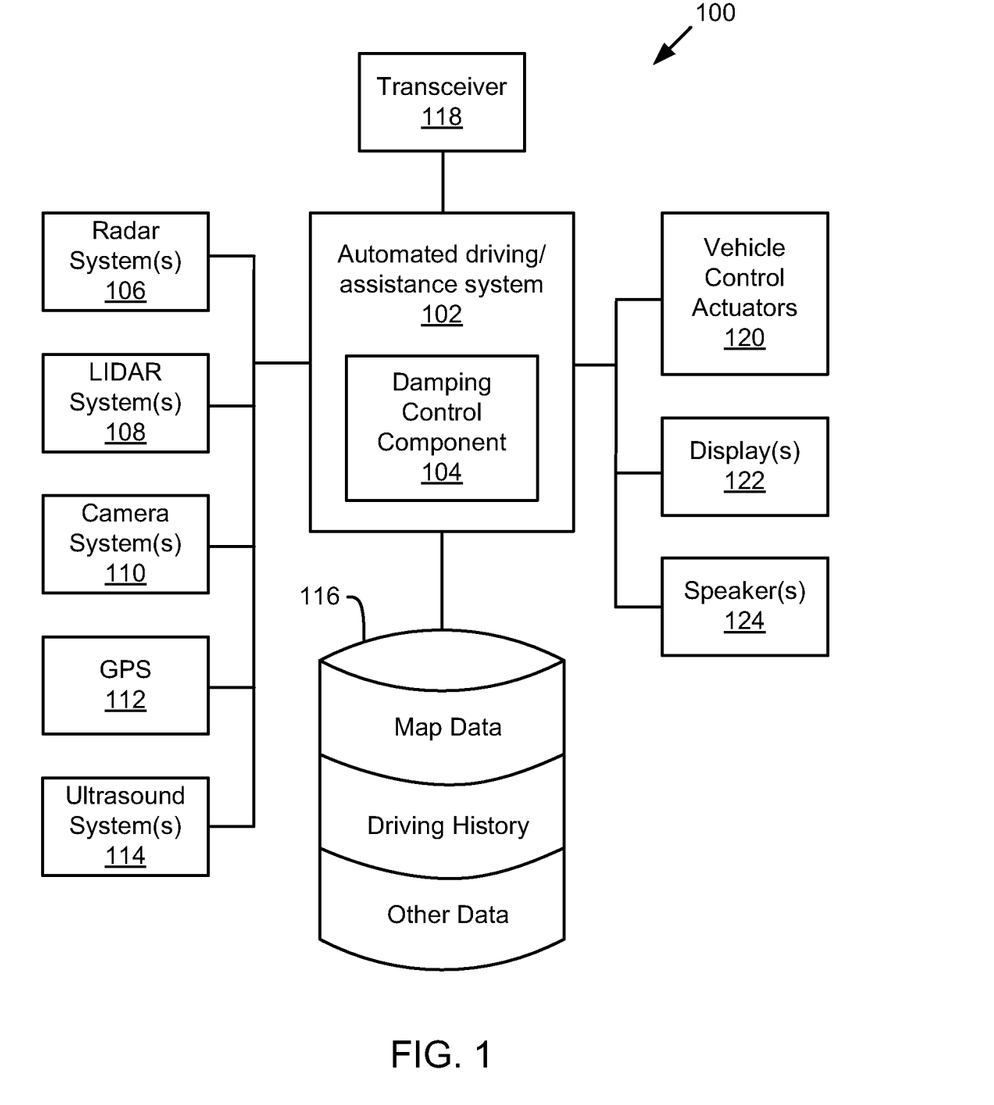
FIG. 1 is a schematic block diagram illustrating an implementation of a vehicle control system that includes an automated driving/assistance system, according to one embodiment.

Referring now to the figures, FIG. 1 illustrates an example vehicle control system 100. The vehicle control system 100 includes an automated driving/assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, suspension damping, or any other driving or auxiliary systems of the vehicle. In another example, the automated driving/assistance system 102 may not be able to provide any control of the driving (e.g., steering, acceleration, or braking), but may provide notifications and alerts to assist a human driver in driving safely. For example, the automated driving/assistance system 102 may include one or more controllers (such as those discussed herein) that provide or receive data over a controller bus and use the data to determine actions to be performed and/or provide instructions or signals to initiate those actions.

The automated driving/assistance system 102 may include a damping control component 104 that is configured to detect current driving conditions or driving parameters and control the damping rate for suspension of the vehicle. For example, the damping control component 104 may vary a viscous damping coefficient of a shock absorber to improve performance or ride based on the road, speed, braking, or other conditions. In one embodiment, the damping control component 104 may provide damping control during driving and also may provide damping control for a time period after a vehicle has stopped. For example, providing damping control after a vehicle has stopped may reduce bouncing, recoil, or other movements that can cause passenger's heads to move upon stopping (e.g., head bob).

The vehicle control system 100 also includes one or more sensor systems/devices for detecting a presence of nearby objects, lane markers, bumps, road texture, and/or or determining a location of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or one or more ultrasound systems 114. The vehicle control system 100 may include a data store 116 for storing relevant or useful data for navigation and safety such as map data, a driving history (i.e., drive history), or other data. The vehicle control system 100 may also include a transceiver 118 for wireless communication with a mobile or wireless network, other vehicles, infrastructure, cloud or remote computing or storage resources, or any other communication system.

The vehicle control system 100 may include vehicle control actuators 120 to control various aspects of the driving of the vehicle such as electric motors, switches or other actuators, to control braking, acceleration, steering, suspension damping, or the like. For example, the vehicle control actuators 120 may include semi-active dampers or shock absorbers on each wheel that can be controlled with a current or electrical signal. The vehicle control system 100 may include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver notification. The vehicle control actuators 120, displays 122, speakers 124, or other parts of the vehicle control system 100 may be controlled by one or more of the controllers of the automated driving/assistance system 102.

In one embodiment, the automated driving/assistance system 102 is configured to control driving or navigation of a parent vehicle. For example, the automated driving/assistance system 102 may control the vehicle control actuators 120 to drive a path within lanes on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time. In one embodiment, the automated driving/assistance system 102 also uses information stored in a driving history (locally or remotely) for determining conditions in a current environment. The automated driving/assistance system 102 may implement one or more algorithms, applications, programs, or functionality that drive or assist in driving of the vehicle.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
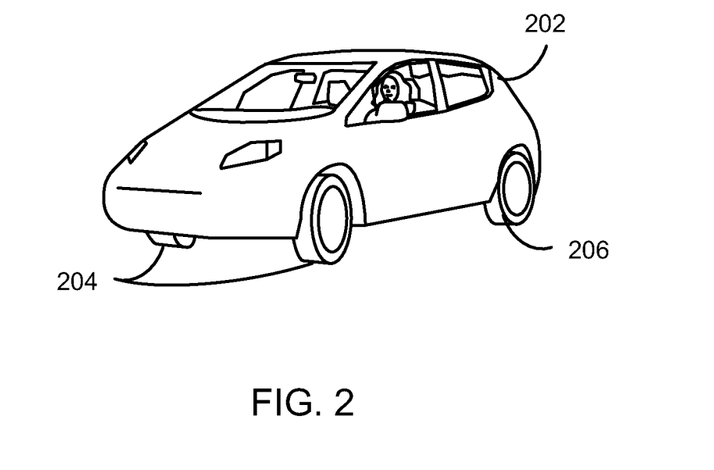
FIG. 2 illustrates a perspective side-view of a vehicle.

FIG. 2 illustrates a perspective side-view of a vehicle 202 during a braking/stopping maneuver. The vehicle 202 includes front wheels 204 and rear wheels 206. During a stop, suspension for the front wheels 204 may compress and suspension for the rear wheels 206 may expand so that the vehicle 202 is pitched or tilted forward. After coming to a stop, the vehicle 202 will then return to a level (zero pitch or tilt). If the suspension is not sufficiently damped, the front end may jerk upward (and rear end may jerk downward) causing passenger discomfort or cargo motion. In one embodiment, damping at the front and rear wheels 204, 206 may be increased to reduce the speed at which the suspension returns to level, even when stopped. This can significantly reduce the residual body motion after a stop. In one embodiment, after the vehicle 202 has been stopped for a period of time, the damping control may cease to save energy.

Figure 3:
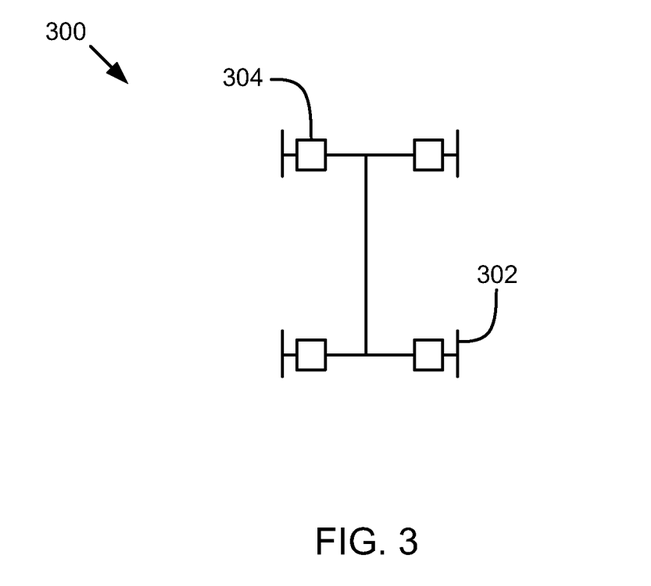
FIG. 3 illustrates a schematic plan view of a vehicle with wheels and shock-absorbers.

FIG. 3 is a schematic plan view diagram schematically illustrating the wheels 302 and shock-absorbers 304 of a vehicle 300. The vehicle 300 includes semi-active shock-absorbers 304 at each wheel 302, for example, as part of the vehicle suspension. Based on the conditions of the vehicle 300, including a forward or lateral velocity, road bumpiness, steering wheel position, or the like, the vehicle 300 may adjust an amount of current provided to each shock-absorber 304 to improve performance and/or increase riding comfort. For example, an increased current level to a shock-absorber 304 may stiffen or reduce the maximum speed at which the shock-absorber 304 may compress or return to an uncompressed state. The vehicle 300 may continue to monitor conditions and/or adjust the amount of current even after the vehicle stops. This may be helpful because, after driving and braking to a complete stop, the vehicle suspension may not yet be at an equilibrium state. By allowing a damping control algorithm to continue for at least a brief period after stopping, the shock-absorbers may cause the vehicle to return to an equilibrium state more smoothly than if there were only zero-current provided to the shock-absorbers 304. After a brief period, or after the vehicle has settled, damping control and monitoring may be deactivated to save fuel and/or electrical energy usage.

Figure 4:
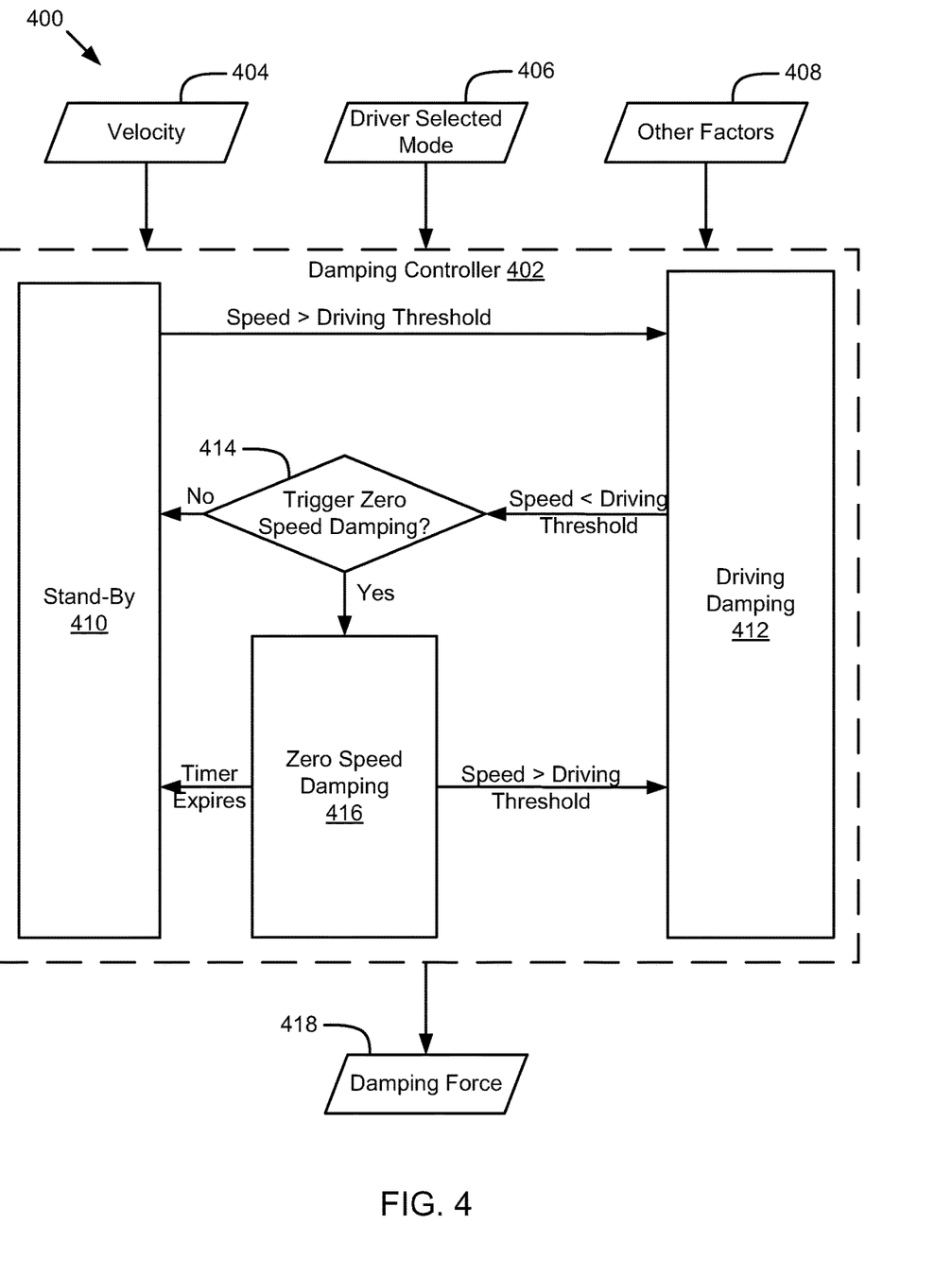
FIG. 4 is a schematic block diagram illustrating a method for damping vehicle suspension, according to one embodiment.

FIG. 4 is a schematic block diagram illustrating data flow for a method 400 for damping vehicle suspension. A damping controller 402 (such as the damping control component 104) receives driving parameters or other inputs for the current state or driving conditions for a vehicle. The driving parameters may include a vehicle velocity 404, a driver selected mode 406, and/or other driving factors 408. The vehicle velocity 404 may include a vehicle speed, wheel rotation speed, or other information about a direction or speed of travel. The driver selected mode 406 may include a driving mode selected by a driver. For example, the driver may select an aggressive driving mode, smooth driving mode, conservative driving mode, or the like to control how smooth or aggressive the suspension should make the riding experience. For example, an aggressive driving mode may improve performance, but may result in less smooth driving and a conservative driving mode may provide a smoother driving experience. The other driving factors 408 may include lateral speed (e.g., movement not parallel to an axis of the vehicle), braking pressure, vehicle pitch (e.g., forward or negative pitch, or rear or positive pitch), steering wheel position, or the like.

Based on these parameters the damping controller 402 may determine or output a damping force 418. The damping force 418 may be controlled using instructions or may be controlled using a current provided to shock-absorbers of the one or more wheels. In one embodiment, the damping controller 402 may determine or output a damping force 418 for each wheel of the vehicle. Depending on the current state of a damping algorithm, the damping controller 402 may determine when and how to output or determine a damping force.

In one embodiment, the damping controller 402 starts out in a stand-by state 410. In the stand-by state 410, the damping force 418 may be zero and the damping controller 402 may have a reduced or no processing load. If, during the stand-by state 410, the vehicle starts driving and the speed of the vehicle exceeds a driving threshold, the damping controller 402 transitions to a driving damping state 412. In the driving damping state 412 the damping controller 402 determines a damping force based on the input parameters 404, 406, and 408. During the driving damping state 412, if the vehicle slows below a threshold speed, the damping controller 402 may determine 414 whether to trigger zero speed damping. The damping controller 402 may determine 414 whether to trigger zero speed damping based on the parameters 404, 406, 408. For example, if a braking pressure exceeds a threshold, a vehicle pitch exceeds or falls below a threshold (e.g., a forward pitch may be a negative value), or the vehicle has some side-to-side motion above a threshold, the damping controller 402 may enter a zero speed damping state 416 (yes at 414). If zero speed damping 416 is not triggered (no at 414), the damping controller may again enter the stand-by state 410.

If the damping controller 402 enters the zero speed damping state 416, the damping controller may continue to provide or determine a damping force 418. For example, in the zero speed damping state 416, the damping controller 402 may continue to provide or determine a damping force 418 based on the parameters 404, 406, 408 even when the vehicle drops below the driving threshold and after the vehicle reaches zero speed/velocity, at least for a time period. After the vehicle has stopped and a timer expires (e.g., after a threshold time) the damping controller 402 transitions from the zero speed damping state 416 to the stand-by state 410. On the other hand, if the vehicle speed increases to be greater than the driving threshold before the vehicle reaches zero or the time expires, the damping controller 402 transitions from the zero speed damping state 416 back to the driving damping state 412. Because the damping controller 402 may continue to determine and output a damping force 418 even below the driving threshold and/or after reaching zero velocity, a reduced amount of wheel grab, head bob, or other vehicle movement upon stopping or slowing may be achieved.

Figure 5:
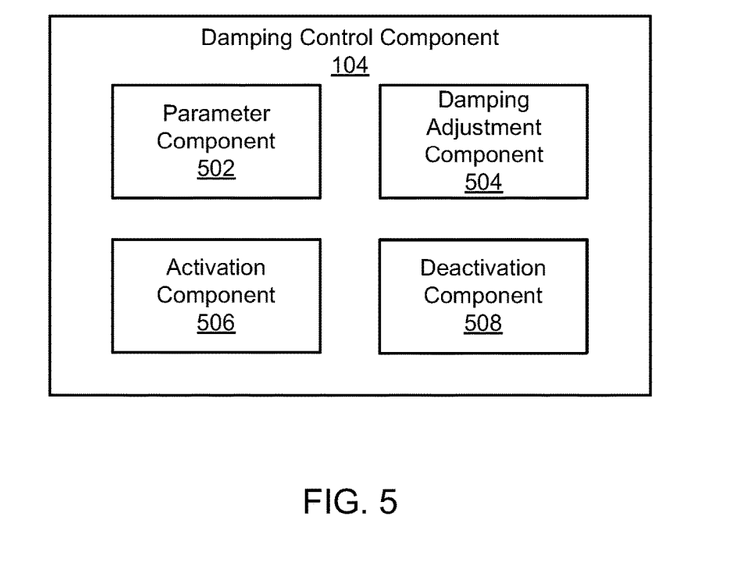
FIG. 5 is a schematic block diagram illustrating example components of a damping control component, according to one implementation.

Turning to FIG. 5, a schematic block diagram illustrating components of a damping control component 104, according to one embodiment, is shown. The damping control component 104 includes a parameter component 502, a damping adjustment component 504, a deactivation component 508, and an activation component 506. The components 502-508 are given by way of illustration only and may not all be included in all embodiments. In fact, some embodiments may include only one or any combination of two or more of the components 502-508. For example, some of the components 502-508 may be located outside the damping control component 104, such as within the automated driving/assistance system 102 or elsewhere.

The parameter component 502 is configured to determine one or more driving parameters of a vehicle. For example, the parameter component 502 may receive sensor data, driving parameters, or other data from sensors or controllers of a vehicle control system 100. The parameters may include a velocity of the vehicle, a vehicle pitch, a sideways or longitudinal velocity, a braking pressure, road surface information, an acceleration or deceleration rate, or the like. In one embodiment, the parameter component 502 may receive sensor data and compute a desired driving parameter.

The damping adjustment component 504 is configured to adjust damping of suspension of the vehicle. For example, the damping adjustment component 504 may implement the method 400 of FIG. 4. In one embodiment, the damping adjustment component 504 adjusts damping of suspension of the vehicle during driving based on the one or more driving parameters obtained by the parameter component 502. In one embodiment, damping adjustment component 504 activates or begins to adjust damping of suspension of the vehicle in response to detecting that a forward velocity of the vehicle exceeds a threshold velocity. For example, when a vehicle is initially powered on, the damping adjustment component 504 may not perform suspension damping until the vehicle begins moving at least a threshold velocity. The damping adjustment component 504 may adjust damping of suspension by independently controlling damping of suspension for each wheel based on the one or more driving parameters. The damping adjustment component 504 may adjust damping by periodically (on a second, millisecond, or other basis) while damping adjustment is active. For example, damping is not necessarily non-zero during damping adjustment. Rather, the damping adjustment component 504 is actively monitoring driving parameters and calculating new damping forces or outputs as needed. During damping adjustment, the damping current or other output may vary according to changes in driving parameters and, at times, may provide zero damping current or adjustment to the default damping forces of the suspension.

In one embodiment, the damping adjustment component 504 also continues to perform damping adjustment after the vehicle slows below the threshold velocity and/or stops completely (vehicle velocity is zero). For example, the damping adjustment component 504 may adjust damping of suspension at a zero velocity for a threshold time period based on the one or more driving parameters in response to transitioning from a non-zero velocity to the zero velocity. The threshold time may vary for specific types of vehicles, driving conditions, or even a driver selected driving mode. Thus, in one embodiment, damping adjustment is not only provided while the vehicle is moving, but may also be performed after the vehicle slows and even stops. After the threshold time expires, damping adjustment (which may include determining a damping output or damping force) may stop to reduce energy needs.

The activation component 506 is configured to determine whether to trigger adjusting damping at the zero velocity based on the one or more parameters. For example, the activation component 506 may, previous to reaching the zero velocity, determine that the current conditions indicate that zero-velocity damping may be helpful. In one embodiment, the activation component 506, upon dropping below or approaching a threshold velocity, may trigger zero damping velocity if: (1) a braking pressure is above a braking threshold; (2) an acceleration or deceleration rate of the vehicle is above or below an acceleration threshold; and/or (3) a pitch or pitch rate (rate of change of the pitch) is above or below a pitch rate threshold. Thus, zero-velocity damping may only occur in certain situations, but not at other times.

The deactivation component 508 is configured to deactivate adjusting damping of suspension after the threshold time period at the zero velocity. For example, the deactivation component 508 may place the damping control component 104 in a stand-by state after the vehicle has been stopped at zero velocity or as been below a threshold velocity for a determined amount of time (e.g., the time threshold). Once the damping adjustment has been deactivated, it may remain in an inactive state until the vehicle again accelerates above the threshold speed.

Figure 6:
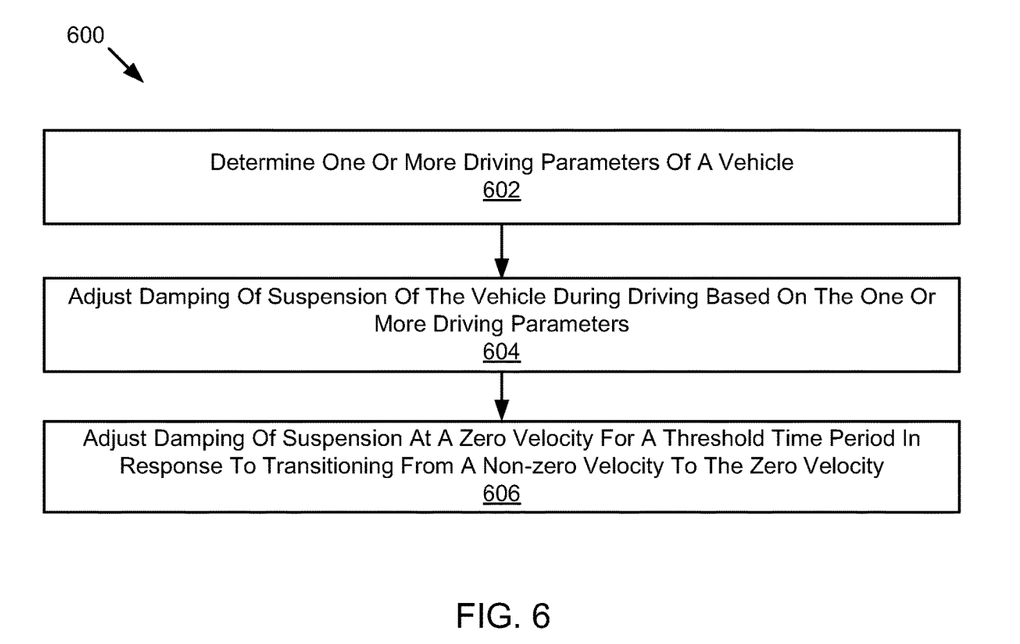
FIG. 6 is a schematic block diagram illustrating a method for damping control, according to one implementation.

FIG. 6 is a schematic flow chart diagram illustrating a method 600 for suspension damping of a vehicle. The method 600 may be performed by a damping control component such as the damping control component 104 of FIG. 1 or 5 or the damping controller 400 of FIG. 4.

The method 600 begins and a parameter component 502 determines 602 one or more driving parameters of a vehicle. The one or more driving parameters may include a velocity of the vehicle. The damping adjustment component 504 adjusts 604 damping of suspension of the vehicle during driving based on the one or more driving parameters. The damping adjustment component 504 adjusts 606 damping of suspension at a zero velocity for a threshold time period in response to transitioning from a non-zero velocity to the zero velocity.

Figure 7:
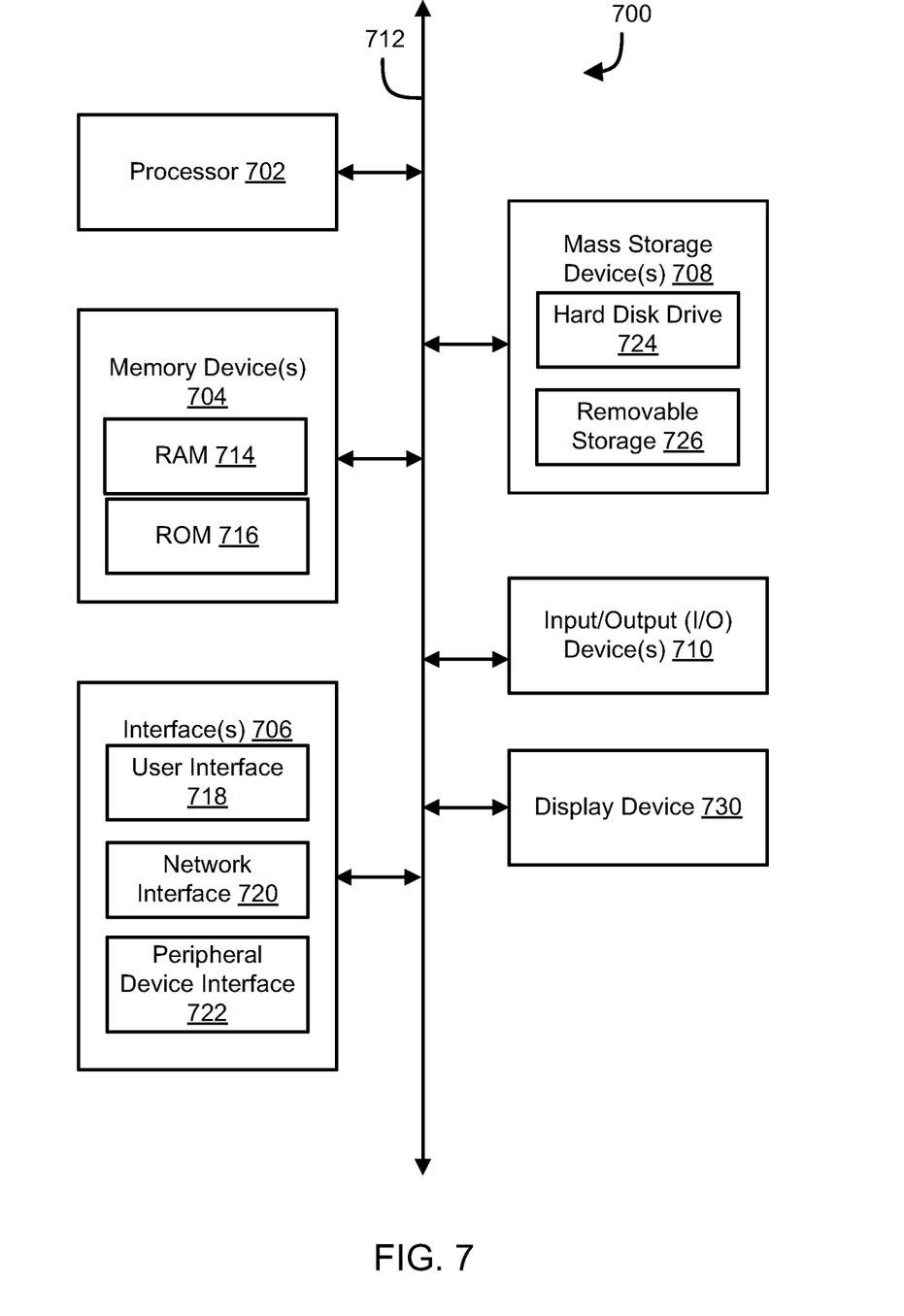
FIG. 7 is a schematic block diagram illustrating a computing system, according to one implementation.

Referring now to FIG. 7, a block diagram of an example computing device 700 is illustrated. Computing device 700 may be used to perform various procedures, such as those discussed herein. Computing device 700 can function as a damping control component 104, automated driving/assistance system 102, server, or any other computing entity. Computing device 700 can perform various monitoring functions as discussed herein, and can execute one or more application programs, such as the application programs or functionality described herein. Computing device 700 can be any of a wide variety of computing devices, such as a desktop computer, in-dash computer, vehicle control system, a notebook computer, a server computer, a handheld computer, tablet computer and the like.

Computing device 700 includes one or more processor(s) 702, one or more memory device(s) 704, one or more interface(s) 706, one or more mass storage device(s) 708, one or more Input/Output (I/O) device(s) 710, and a display device 730 all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM) 714) and/or nonvolatile memory (e.g., read-only memory (ROM) 716). Memory device(s) 704 may also include rewritable ROM, such as Flash memory.

Mass storage device(s) 708 include various computer readable media, such as magnetic tapes, magnetic disks, optical disks, solid-state memory (e.g., Flash memory), and so forth. As shown in FIG. 7, a particular mass storage device is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, and the like.

Display device 730 includes any type of device capable of displaying information to one or more users of computing device 700. Examples of display device 730 include a monitor, display terminal, video projection device, and the like.

Interface(s) 706 include various interfaces that allow computing device 700 to interact with other systems, devices, or computing environments. Example interface(s) 706 may include any number of different network interfaces 720, such as interfaces to local area networks (LANs), wide area networks (WANs), wireless networks, and the Internet. Other interface(s) include user interface 718 and peripheral device interface 722. The interface(s) 706 may also include one or more user interface elements 718. The interface(s) 706 may also include one or more peripheral interfaces such as interfaces for printers, pointing devices (mice, track pad, or any suitable user interface now known to those of ordinary skill in the field, or later discovered), keyboards, and the like.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Examples

The following examples pertain to further embodiments.

Example 1 is a method for vehicle damping control. The method includes determining one or more driving parameters of a vehicle. The one or more driving parameters comprise a velocity of the vehicle. The method includes adjusting damping of suspension of the vehicle during driving based on the one or more driving parameters. The method also includes adjusting damping of suspension at a zero velocity for a threshold time period in response to transitioning from a non-zero velocity to the zero velocity.

In Example 2, the method as in Example 1 further includes deactivating adjusting damping of suspension after the threshold time period at the zero velocity.

In Example 3, the method as in any of Examples 1-2 further includes, previous to reaching the zero velocity, determining whether to trigger adjusting damping at the zero velocity based on the one or more parameters.

In Example 4, determining whether to trigger adjusting damping based on the one or more parameters as in Example 3 includes determining based on one or more of braking pressure above a braking threshold, an acceleration or deceleration rate above an acceleration threshold, or a pitch rate above a pitch rate threshold.

In Example 5, adjusting damping of suspension of the vehicle during driving as in any of Examples 1-4 includes adjusting damping in response to detecting that a forward velocity of the vehicle exceeds a threshold velocity.

In Example 6, adjusting damping of suspension as in any of Examples 1-5 includes independently controlling damping of suspension for each wheel based on the one or more driving parameters.

In Example 7, adjusting damping as in any of Examples 1-6 includes providing an instruction or current to dampers at one or more wheels of the vehicle to control an amount of damping.

Example 8 is a system for damping control for a vehicle that includes a parameter component and a damping adjustment component. The parameter component is configured to determine one or more driving parameters of a vehicle, wherein the one or more driving parameters comprise a velocity of the vehicle. The damping adjustment component is configured to adjust damping of suspension of the vehicle during driving based on the one or more driving parameters. The damping adjustment component is configured to adjust damping of suspension at a zero velocity for a threshold time period based on the one or more driving parameters in response to transitioning from a non-zero velocity to the zero velocity.

In Example 9, system as in Example 8 further includes a deactivation component configured to deactivate adjusting damping of suspension after the threshold time period at the zero velocity.

In Example 10, the system as in any of Examples 8-9 further includes an activation component configured to, previous to reaching the zero velocity, determine whether to trigger adjusting damping at the zero velocity based on the one or more parameters.

In Example 11, the activation component as in Example 10 determines whether to trigger adjusting damping based on the one or more parameters comprising one or more of braking pressure above a braking threshold, an acceleration or deceleration rate above an acceleration threshold, or a pitch rate above a pitch rate threshold.

In Example 12, the damping adjustment component as in any of Examples 8011 is configured to adjust damping of suspension of the vehicle during driving in response to detecting that a forward velocity of the vehicle exceeds a threshold velocity.

In Example 13, the damping adjustment component as in any of Examples 8-12 is configured to adjust damping of suspension by independently controlling damping of suspension for each wheel based on the one or more driving parameters.

In Example 14, the damping adjustment component as in any of Examples 8-13 is configured to adjust damping of suspension by providing an instruction or current to dampers at one or more wheels of the vehicle to control an amount of damping.

Example 15 is a computer readable storage media storing instructions that, when executed by one or more processors, cause the processors to determine one or more driving parameters of a vehicle, wherein the one or more driving parameters comprise a velocity of the vehicle. The instructions cause the one or more processors to adjust damping of suspension of the vehicle during driving based on the one or more driving parameters. The instructions cause the one or more processors to adjust damping of suspension at a zero velocity for a threshold time period in response to transitioning from a non-zero velocity to the zero velocity.

In Example 16, the computer readable storage of Example 15 further includes instructions that cause the processors to deactivate adjusting damping of suspension after the threshold time period at the zero velocity.

In Example 17, the computer readable storage as in any of Examples 15-16 further includes instructions that cause the processors to, previous to reaching the zero velocity, determine whether to trigger adjusting damping at the zero velocity based on the one or more parameters, wherein the one or more parameters comprise one or more of: a braking pressure above a braking threshold; an acceleration or deceleration rate above an acceleration threshold; or a pitch rate above a pitch rate threshold.

In Example 18, the computer readable storage as in any of Examples 15-17 further includes instructions that cause the processors to adjust damping of suspension of the vehicle during driving by adjusting damping in response to detecting that a forward velocity of the vehicle exceeds a threshold velocity.

In Example 19, the computer readable storage as in any of Examples 15-18 further includes instructions that cause the processors to adjust damping of suspension by independently controlling damping of suspension for each wheel based on the one or more driving parameters.

In Example 20, the computer readable storage as in any of Examples 15-19 further includes instructions that cause the processors to adjust damping by providing an instruction or current to dampers at one or more wheels of the vehicle to control an amount of damping.

Example 21 is a system or device that includes means for implementing a method, system, or device as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
   determining whether one or more driving parameters of a vehicle exceeds a threshold value associated with that driving parameter, wherein the one or more driving parameters comprises brake pressure, longitudinal acceleration, or pitch rate; and
   in response to at least one of the one or more driving parameters exceeding the threshold value associated with that driving parameter, adjusting damping of suspension of the vehicle after the vehicle transitions from a non-zero velocity to a zero velocity.

2. The method of claim 1, further comprising:
   tracking velocity of the vehicle; and
   determining whether the brake pressure of the vehicle exceeds the threshold value associated with the brake pressure during a deceleration of the vehicle.

3. The method of claim 1, further comprising, in response to the vehicle transitioning from a non-zero velocity to a zero velocity, adjusting the damping of the suspension of the vehicle for a threshold time period when the vehicle remains at the zero velocity.

4. The method of claim 1, further comprising adjusting the damping of the suspension of the vehicle during driving based on the one or more driving parameters.

5. The method of claim 1, further comprising deactivating adjusting the damping of the suspension of the vehicle after the vehicle has been at the zero velocity for a threshold time period.

6. The method of claim 1, further comprising, during deceleration of the vehicle, determining whether one or more of:
   a deceleration rate of the vehicle exceeds a deceleration threshold; or
   the pitch rate of the vehicle exceeds the threshold value associated with the pitch rate; and
   adjusting the damping of the suspension of the vehicle in response to the deceleration rate exceeding the deceleration threshold and/or the pitch rate exceeding threshold value associated with the pitch rate.

7. The method of claim 1, wherein adjusting the damping of the suspension of the vehicle comprises independently controlling damping of suspension for each wheel based on the one or more driving parameters.

8. The method of claim 1, wherein adjusting the damping of the suspension of the vehicle comprises providing a current to dampers at one or more wheels of the vehicle to control an amount of damping after the vehicle has reached the zero velocity.

9. The method of claim 1, wherein the one or more driving parameters further comprises road surface information and sideways velocity.

10. The method of claim 1, wherein the threshold values associated with the one or more driving parameters comprises:
    a brake pressure threshold associated with the brake pressure of the vehicle;
    a longitudinal acceleration threshold associated with the longitudinal acceleration of the vehicle; and
    a pitch rate threshold associated with the pitch rate of the vehicle.

11. A system comprising:
    vehicle sensors for sensing one or more driving parameters of a vehicle, the one or more driving parameters comprising a brake pressure of the vehicle, longitudinal acceleration of the vehicle, and pitch rate of the vehicle;
    a suspension of the vehicle; and
    a processor that is programmable to execute instructions stored in non-transitory computer readable storage media, the instructions comprising:
       determining whether the one or more driving parameters of the vehicle exceeds a threshold value associated with that driving parameter; and
       in response to at least one of the one or more driving parameters exceeding the threshold value associated with that driving parameter, adjusting damping of suspension of the vehicle after the vehicle transitions from a non-zero velocity to a zero velocity.

12. The system of claim 11, wherein the instructions further comprise deactivating adjusting the damping of the suspension of the vehicle after the vehicle has been at the zero velocity for a threshold time period.

13. The system of claim 11, wherein the instructions further comprise, during deceleration of the vehicle, determining whether one or more of:
    a deceleration rate of the vehicle exceeds a deceleration threshold; or
    the pitch rate of the vehicle exceeds the threshold value associated with the pitch rate; and
    adjusting the damping of the suspension of the vehicle in response to the deceleration rate exceeding the deceleration threshold and/or the pitch rate exceeding the threshold value associated with the pitch rate.

14. The system of claim 11, wherein adjusting the damping of the suspension of the vehicle comprises independently controlling damping of suspension for each wheel of the vehicle based on the one or more driving parameters.

15. The system of claim 11, wherein adjusting the damping of the suspension of the vehicle comprises providing a current to dampers at one or more wheels of the vehicle to control an amount of damping after the vehicle has reached the zero velocity.

16. Non-transitory computer readable storage media storing instructions executable by one or more processors, the instructions comprising:
    determining whether one or more driving parameters of a vehicle exceeds a threshold value associated with that driving parameter, wherein the one or more driving parameters comprises brake pressure, longitudinal acceleration, or pitch rate; and
    in response to at least one of the one or more driving parameters exceeding the threshold value associated with that driving parameter, adjusting damping of suspension of the vehicle after the vehicle transitions from a non-zero velocity to a zero velocity.

17. The non-transitory computer readable storage media of claim 16, wherein the instructions further comprise, in response to the vehicle transitioning from a non-zero velocity to the zero velocity, adjust damping of the suspension of the vehicle for a threshold time period when the vehicle remains at the zero velocity.

18. The non-transitory computer readable storage media of claim 16, wherein the instructions further comprise adjusting damping of the suspension of the vehicle during driving based on the one or more driving parameters.

19. The non-transitory computer readable storage media of claim 16, wherein the instructions further comprise deactivating adjusting the damping of the suspension of the vehicle after the vehicle has been at the zero velocity for a threshold time period.

20. The non-transitory computer readable storage media of claim 16, wherein the threshold values associated with the one or more driving parameters comprises:
  a brake pressure threshold associated with the brake pressure of the vehicle;
  a longitudinal acceleration threshold associated with the longitudinal acceleration of the vehicle; and
  a pitch rate threshold associated with the pitch rate of the vehicle.

* * * * *